(12) United States Patent
James et al.

(10) Patent No.: US 11,849,713 B2
(45) Date of Patent: Dec. 26, 2023

(54) BERLEY DISPENSER

(71) Applicants: Jenna James, Queensland (AU); Daniel Zagar, Queensland (AU)

(72) Inventors: Jenna James, Queensland (AU); Daniel Zagar, Queensland (AU)

(*) Notice: Subject to any disclaimer, the term of this patent is extended or adjusted under 35 U.S.C. 154(b) by 98 days.

(21) Appl. No.: 17/515,667

(22) Filed: Nov. 1, 2021

(65) Prior Publication Data

US 2023/0040078 A1   Feb. 9, 2023

(30) Foreign Application Priority Data

Aug. 9, 2021   (AU) ................................ 2021902455

(51) Int. Cl.
*A01K 97/02* (2006.01)
*A01K 97/04* (2006.01)

(52) U.S. Cl.
CPC ............ *A01K 97/02* (2013.01); *A01K 97/045* (2013.01)

(58) Field of Classification Search
CPC .............................. A01K 97/02; A01K 97/045
See application file for complete search history.

(56) References Cited

U.S. PATENT DOCUMENTS

| | | | |
|---|---|---|---|
| 6,581,322 B1* | 6/2003 | Spinelli .................. | A01K 97/02 43/44.99 |
| 7,152,363 B1* | 12/2006 | Garcia-Cruz .......... | A01K 97/02 43/44.99 |
| 2004/0061008 A1* | 4/2004 | Hauler ................... | A01K 97/02 241/199.12 |
| 2017/0318793 A1* | 11/2017 | Zagar ..................... | A01K 97/02 |

* cited by examiner

*Primary Examiner* — Richard G Davis
(74) *Attorney, Agent, or Firm* — WEGMAN HESSLER

(57) ABSTRACT

A berley dispenser, including a container to store berley, a homogenizer within the container to form a homogenized berley from one or more predetermined homogenized berley settings where each setting corresponds to a particular fish type, a discharge port to discharge the homogenized berley, and a controller to control the homogenization of the berley by the selection of the one or more predetermined homogenized berley settings to form the homogenized berley and control the discharge of the homogenized berley. The controller can communicate with a GPS navigator, fish finder or other similar device to coordinate the homogenization of the berley and/or discharge of the homogenized berley.

17 Claims, 12 Drawing Sheets

BERLEY DISPENSER

CROSS REFERENCE TO RELATED APPLICATION

This application claims the priority filing benefit of Australian Patent Application No. 2021902455 filed on Aug. 9, 2021, which is incorporated herein by reference in its entirety.

FIELD OF INVENTION

The present invention relates to fishing and fishing equipment. The present invention has particular but not exclusive application to a berley dispenser that can distribute berley or fish attractant into water. The patent specification describes this use by way of example only and the invention is not limited to this use.

BACKGROUND OF THE INVENTION

Berley is used for attracting fish when fishing. Normally berley is distributed manually or by dispensers controlled by operators.

Normally, berley is prepared by cutting fish or bait into small particles to form a uniform mixture, so that it can be dispensed into water.

One problem with berley distribution is that the berley mixture usually has an unpleasant odour and is often messy in its preparation. It can be unpleasant and time consuming for operators to distribute the berley manually and/or fill or clean the dispensers.

It is an object of the present invention to overcome or at least alleviate one or more of the above mentioned problems with berley distribution and provide the consumer with a useful option.

SUMMARY OF THE INVENTION

In one aspect, the present invention broadly resides in a berley dispenser, comprising:
a container to store berley;
a homogenizer within the container to form a homogenized berley from one or more predetermined homogenized berley settings where each setting corresponds to a particular fish type;
a discharge port to discharge the homogenized berley, and
a controller to control the homogenization of the berley by the selection of the one or more predetermined homogenized berley settings to form the homogenized berley and control the discharge of the homogenized berley;
wherein said controller is operable to communicate with a GPS navigator, fish finder or other similar device to coordinate the homogenization of the berley and/or discharge of the homogenized berley.

The predetermined homogenized berley settings preferably corresponds to a particular fish type by being an effective attractant for a particular fish type.

The controller preferably has an operatively connected input arrangement, a processor, and a plurality of electrical connections connecting the processor to the input arrangement and the berley dispenser so that the berley dispenser can homogenize and discharge the homogenized berley.

Preferably the input arrangement includes one or more interfaces. The one or more interfaces preferably include one or more buttons, a keyboard, a display and/or a touch screen.

The input arrangement allows an operator to interact and to control the operation of the berley dispenser.

The input arrangement allows the activation of one or more functions of the berley dispenser. Preferably the one or more functions includes selecting a fish type from the one or more different fish types; setting chopping speed of the homogenizer; setting chopping time of the homogenizer; setting chopping direction of the homogenizer which includes chopping forwards or chopping backwards; setting berley discharge quantity; setting berley discharge time period; setting new mix of berley; start and/or pause and/or stop the working of the berley dispenser; auto-cleaning of the berley dispenser; setting manually operation of the berley disperser; filling the berley dispenser with water; draining homogenized berley and/or water out of the berley disperser; displaying recipe instructions for the preparation of the berley with respect to different fish types, and/or other personal setting for the berley dispenser.

Preferably the processor can receive and process input from the one or more interfaces to control the operation of the berley dispenser.

Preferably the controller further includes a memory that stores input provided from the one or more interfaces for processing purposes to operate the berley dispenser. Preferably the memory also stores data processed by the processor. In one embodiment, the memory stores default settings for the berley dispenser. In another embodiment, the memory stores recipe instructions for the preparation of the berley with respect to different fish types.

Preferably the controller controls the operation of the homogenizer. Preferably the controller can control the rate and degree of cutting and homogenization. In one embodiment, the controller can control the duration of the homogenization.

Berley with different levels of homogenization attracts different fish types. Preferably each of the homogenized berley settings corresponds to a preparation of berley that attracts a particular fish type. In a preferred embodiment, the berley dispenser has homogenized berley settings in terms of different fish types rather than berley particle size.

Preferably the controller can communicate with GPS to determine the location of the berley dispenser with respect to a geographical position. Preferably the controller can connect to fish finders, GPS navigators and other similar devices to detect fish. The controller can preferably operate the berley dispenser to homogenize the berley for a particular fish type and discharge the homogenized berley when the particular fish type is detected and/or when a particular location is reached.

Preferably the controller further includes one or more lighting indicators to indicate the working status of the berley dispenser. Preferably the one or more lighting indicators are indicators with different colours. In one embodiment, a red light from the one or more lighting indicators indicates that the berley dispenser is waiting for operation. In another embodiment, an orange light from the one or more lighting indicators indicates to add ingredients to the berley dispenser. In a further embodiment, a green light from the one or more lighting indicators indicates that the berley dispenser is working.

In one embodiment, the operation of the berley dispenser is controllable by a remote controller. Preferably the remote controller communicates with the berley dispenser via wireless communication. In one embodiment, the wireless communication is Wi-Fi. In another embodiment, the wireless communication is Bluetooth.

In another embodiment, the operation of the berley dispenser is controllable by a software application on a mobile device. Preferably the mobile device is a mobile phone or tablet.

Preferably the container includes a body portion that can store the berley. Preferably the body portion is cylindrical in shape. In one preferred embodiment, the body portion is made of a transparent plastic material or includes a transparent window so that an operator can observe the interior of the body portion.

Preferably the container includes a head portion that is attached or attachable to the body portion to substantially seal the body portion. In one embodiment, the head portion is sized to fit within an upper end of the body portion. In another embodiment, a seal member is located between the head portion and the body portion to substantially seal the body portion. Preferably the head portion is attached to the body portion by one or more clips.

Preferably the head portion includes a berley opening that allows an operator to place berley, fish or bait and/or water into the body portion. In a preferred embodiment the head portion includes a second seal member positionable into the opening to seal the head portion. Preferably the second seal member is removable and/or replaceable.

Preferably the head portion includes an air pump. Preferably the air pump is an inflation and/or deflation air pump. Preferably the air pump communicates with the outside of the berley dispenser via a hole. Preferably the air pump is operated to draw air into the body portion and/or expel air out of the body portion. Preferably the controller can control the operation of the air pump. In a preferred embodiment, the controller can control the air pump to draw air into the body portion. In a preferred embodiment, the controller can control the air pump to expel air out of the body portion.

Preferably the head portion includes a level sensor. Preferably the level sensor enables activation of the operation of the air pump. Preferably the level sensor enables the air pump to stop drawing water into the body portion when the water level has reached a predetermined level. Preferably the level sensor is a float.

Preferably the homogenizer is located within the body portion. More preferably the homogenizer is attached to the head portion. Preferably the homogenizer includes a motor connected to a shaft with one or more blades located at or near a free end of the shaft. In one preferred embodiment, the one or more blades are positioned near the base of the body portion. Preferably the shaft is supported by a supporting member that is located at or near the free end of the shaft. The controller preferably can control the rotating direction of the one or more blades.

Preferably the discharge port is located at or adjacent the base of the body portion. Preferably the discharge port includes a discharge opening. Preferably the discharge opening allows the homogenized berley to be discharged into the water.

Preferably the discharge port includes a valve operatively associated with the discharge opening. Preferably the valve is a pressure relief valve. Preferably the pressure relief valve operates as a two way valve. In one embodiment, the pressure relief valve allows a water/berley mix to exit the body portion when the internal pressure within the body portion is higher than pressure outside the berley dispenser when the pressure difference has reached a first predetermined threshold. In another embodiment, the pressure relief valve allows water to enter the body portion when the internal pressure within the body portion is lower than the pressure outside the berley dispenser by a second predetermined pressure difference threshold. Preferably the pressure relief valve is a simple flexible membrane type with one or more slits that allows deflection of the membrane to open and close.

Alternatively, the pressure relief valve is a one way valve that allows fluid to exit the body portion. In one embodiment, the discharge port includes a further valve that allows fluid to enter the body portion. Preferably the further valve is a pressure relief valve.

Preferably the controller is operable to control the operation of the discharge port. Preferably the controller is operable to control the operation of the pressure relief valve. In one embodiment, the controller is operable to control the pressure relief valve to allow water to enter the body portion. In another embodiment, the controller is operable to control the pressure relief valve to allow water/berley mix to exit the body portion.

Preferably the container further includes an attachment portion that allows attachment to the side of a boat. Preferably the attachment portion is attached to the outside of the side of the boat. In one embodiment, the attachment portion includes one or more brackets which can then be attached to the side of the boat. In another embodiment, the berley dispenser can be operatively positioned away from the water and a hose is used to connect to the discharge port and serve as a conduit to allow the homogenized berley to flow from the berley dispenser to the water where it is to be discharged.

In another aspect, the present invention broadly resides in a berley dispensing system, including
a berley dispenser as described above, and
an attachment portion to attach the berley dispenser to a boat,
wherein in use, the berley dispenser can wirelessly communicate with a GPS navigator, fish finder or other similar device to coordinate the homogenization of the berley and/or discharge of the homogenized berley.

In another aspect, the present invention broadly resides in a method of dispensing berley using the berley dispenser as described above, comprising the steps:
controlling operation of the berley dispenser by a controller;
communicating with the GPS to determine the location of the berley dispenser with respect to a geographical position and/or detecting a particular type of fish by a fish finder, GPS navigator or other similar device, and
dispensing a homogenized berley at a predetermined time or location.

Preferably different amounts and concentration of berley can be dispensed depending on the fish type wanted, the fish type selected with the dispenser, geographical location or other programmable trigger. By lowering the concentration of the berley by increasing the proportional volume of water in the berley mix, the fish bait/berley can be extended thereby conserving the source fish bait.

The features described with respect to one aspect also apply where applicable to all other aspects of the invention. Furthermore, different combinations of described features are herein described and claimed even when not expressly stated.

BRIEF DESCRIPTION OF THE DRAWINGS

The features described with respect to one aspect also apply where applicable to all other aspects of the invention. Furthermore, different combinations of described features are herein described and claimed even when not expressly stated.

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
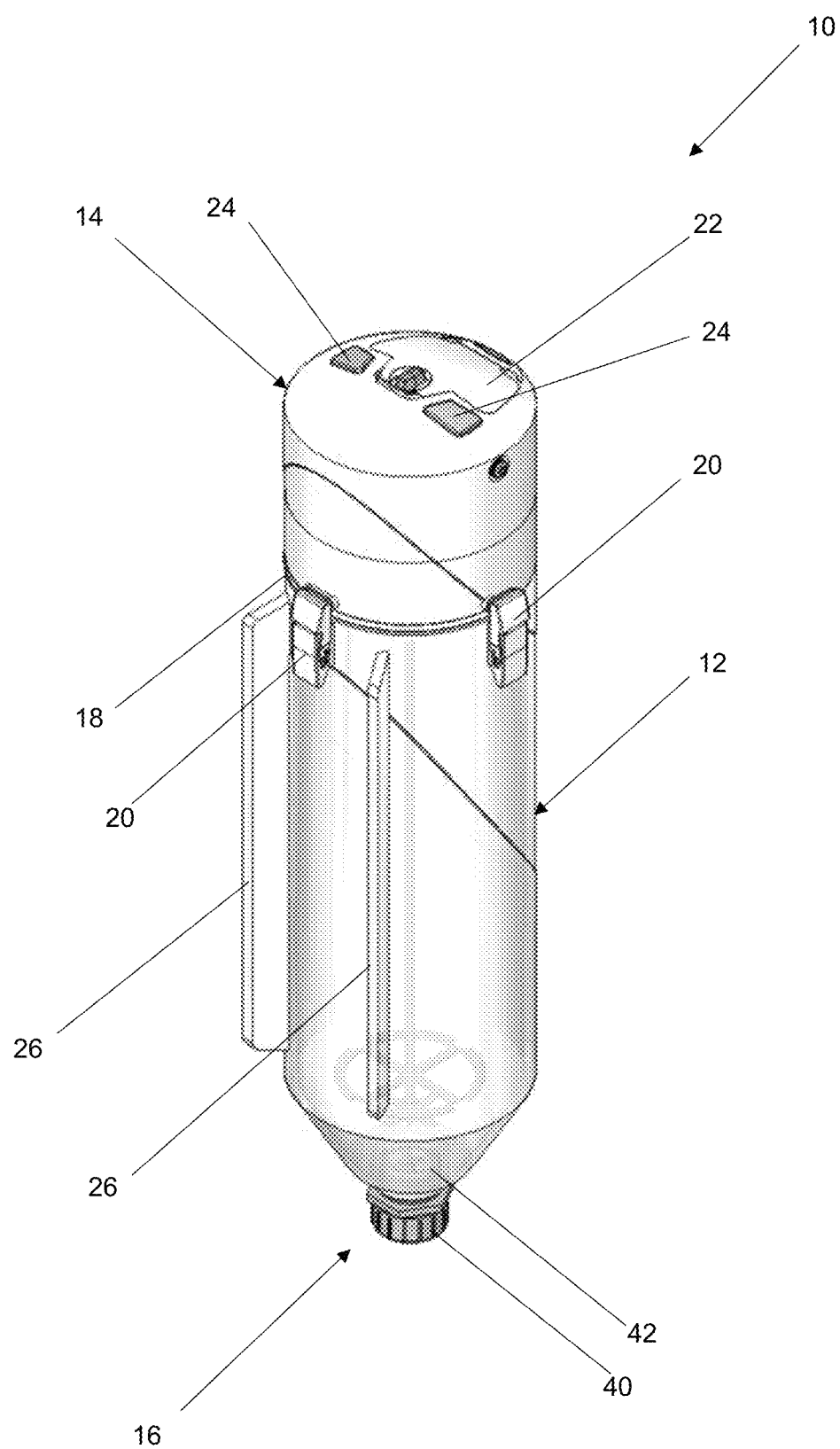
FIG. 1 is a schematic view of a berley dispenser according to a first embodiment of the present invention.
Figure 2:
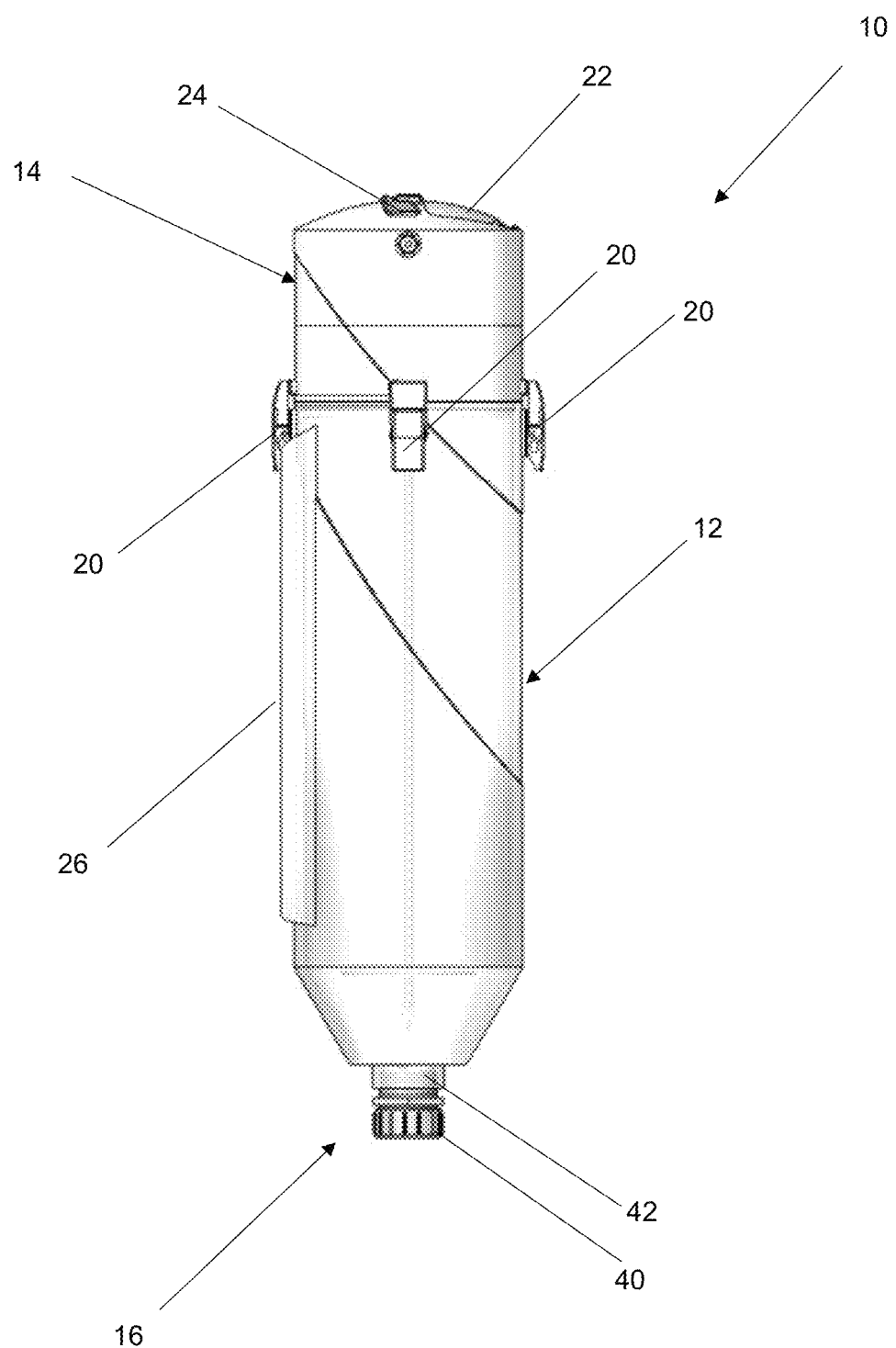
FIG. 2 is a side view of the berley dispenser of FIG. 1.
Figure 3:
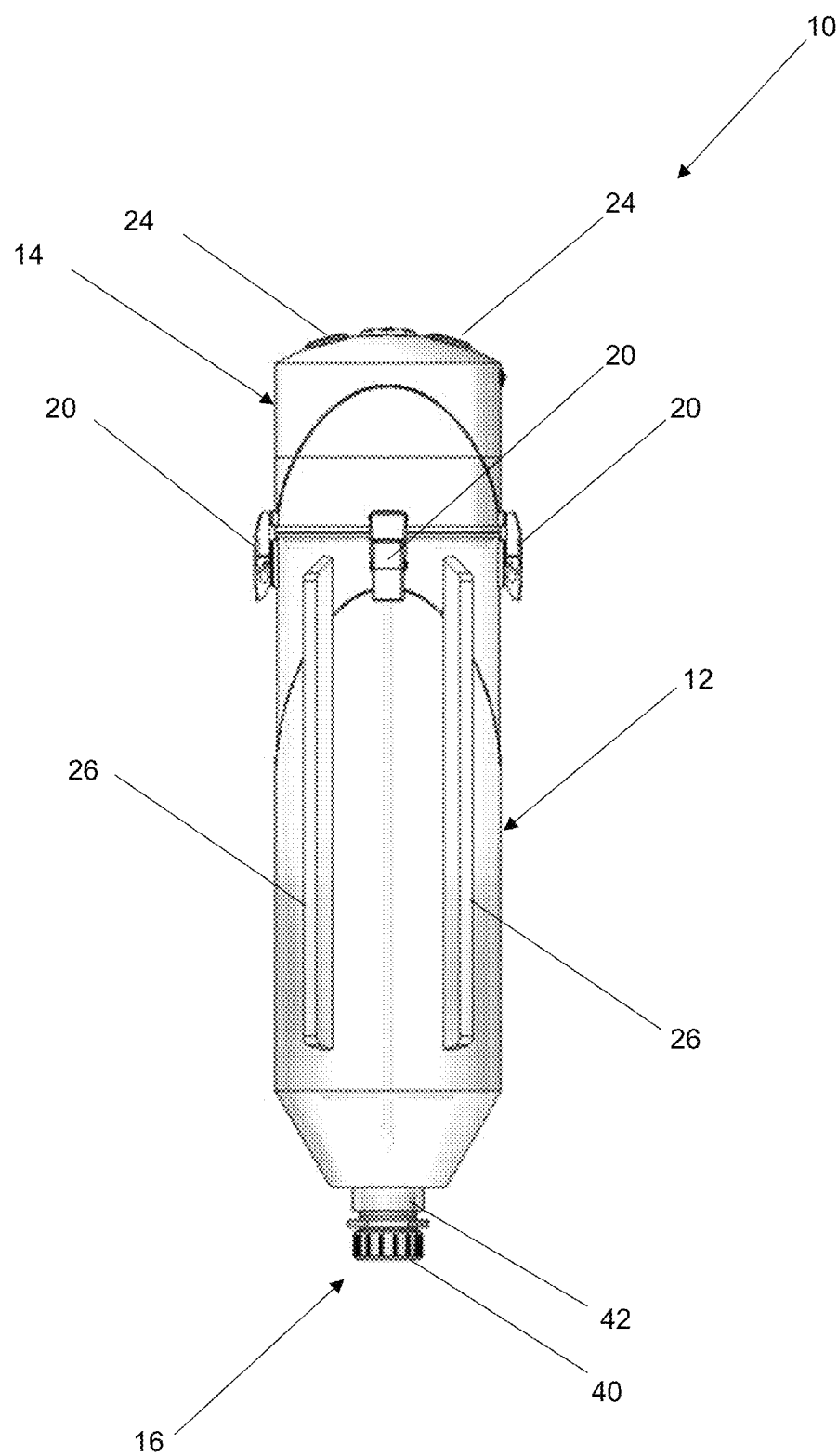
FIG. 3 is a rear view of the berley dispenser of FIG. 1.

With reference to FIGS. 1 to 4, there is shown a berley dispenser 10 according to a first embodiment of the present invention. The berley dispenser 10 has a body portion 12, a head portion 14, a homogenizer 30 and a discharge port 16.

The body portion 12 is cylindrical in shape. The body portion 12 is made of a transparent plastic material that allows an operator to observe the interior of the body portion 12.

The head portion 14 is attached to the body portion 12 by several clips 20. The head portion 14 fits within the upper end 18 of the body portion 12. A seal 28 (as shown in FIG. 4) is located between the body portion 12 and the head portion 14 to provide a fluid tight seal.

The head portion 14 has an berley opening (not shown) to allow an operator to place berley and/or ingredients into the body portion 12. A cap 22 is used to seal the head portion 14.

The head portion 14 also has two air pump breather vents 24. The two air pump breather vents 24 allow air to enter and/or exit the body portion 12.

Figure 4:
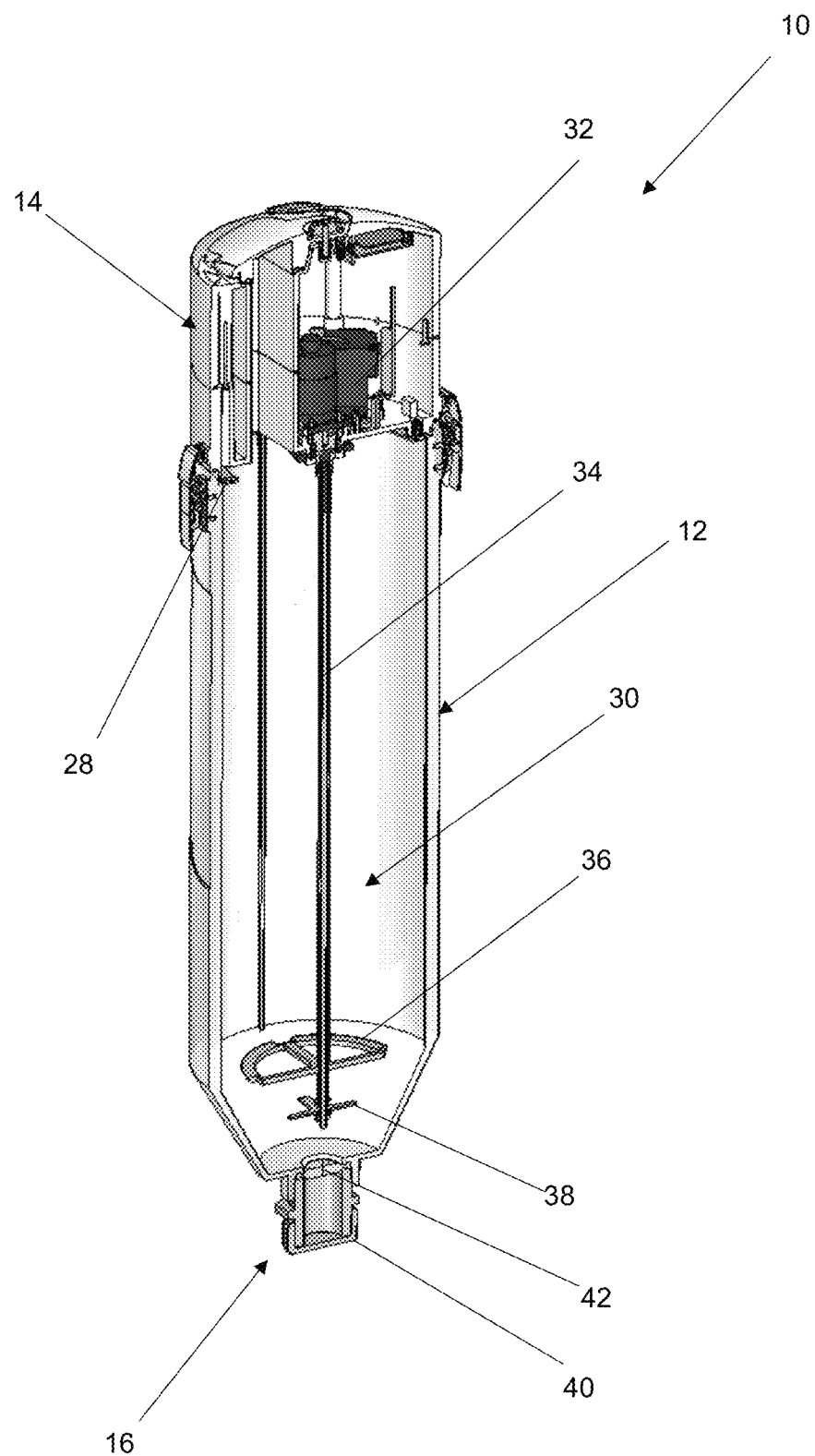
FIG. 4 is a cross section view of the berley dispenser of FIG. 1.
Figure 5:
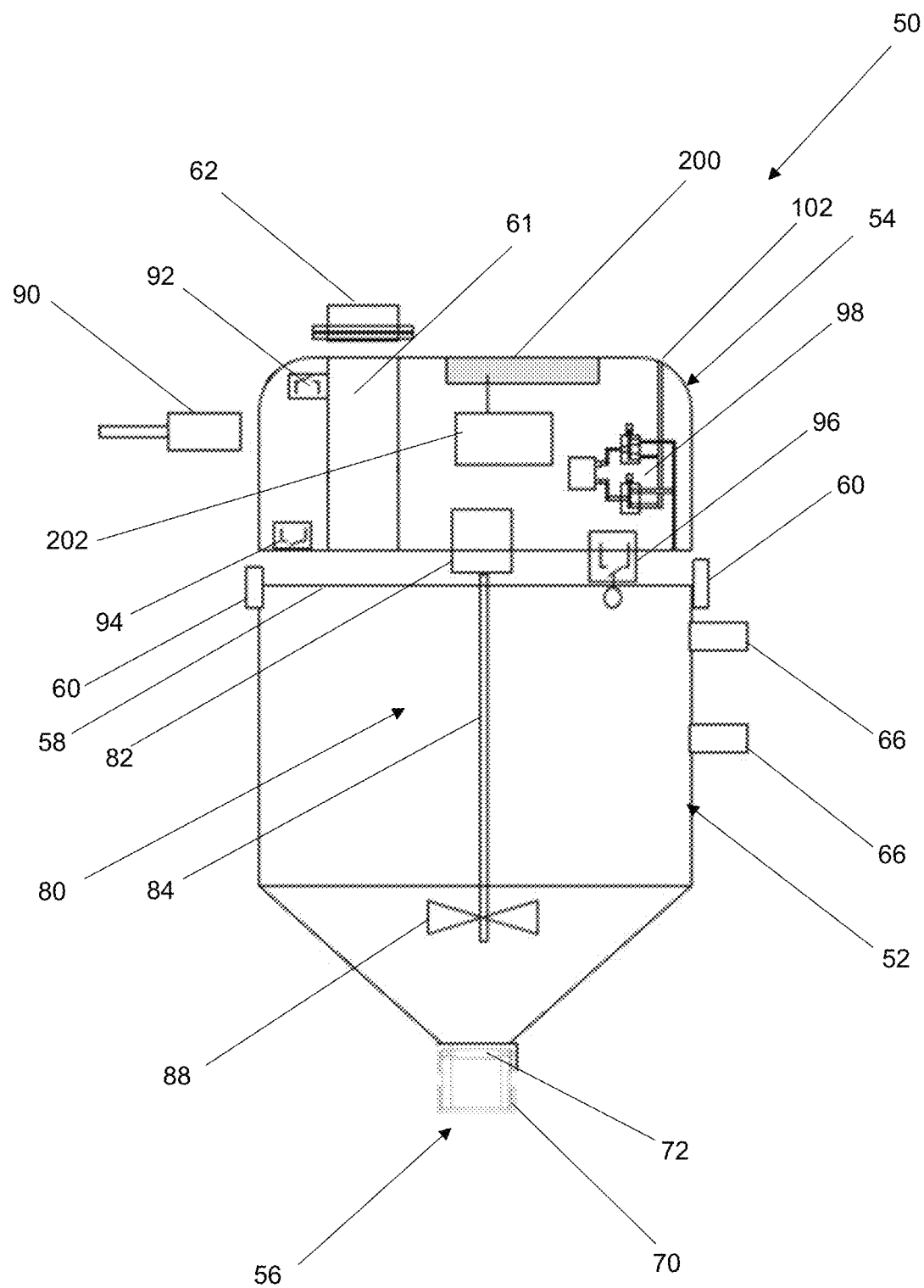
FIG. 5 is a schematic diagram of a berley dispenser according to a second embodiment of the present invention.
Figure 6:
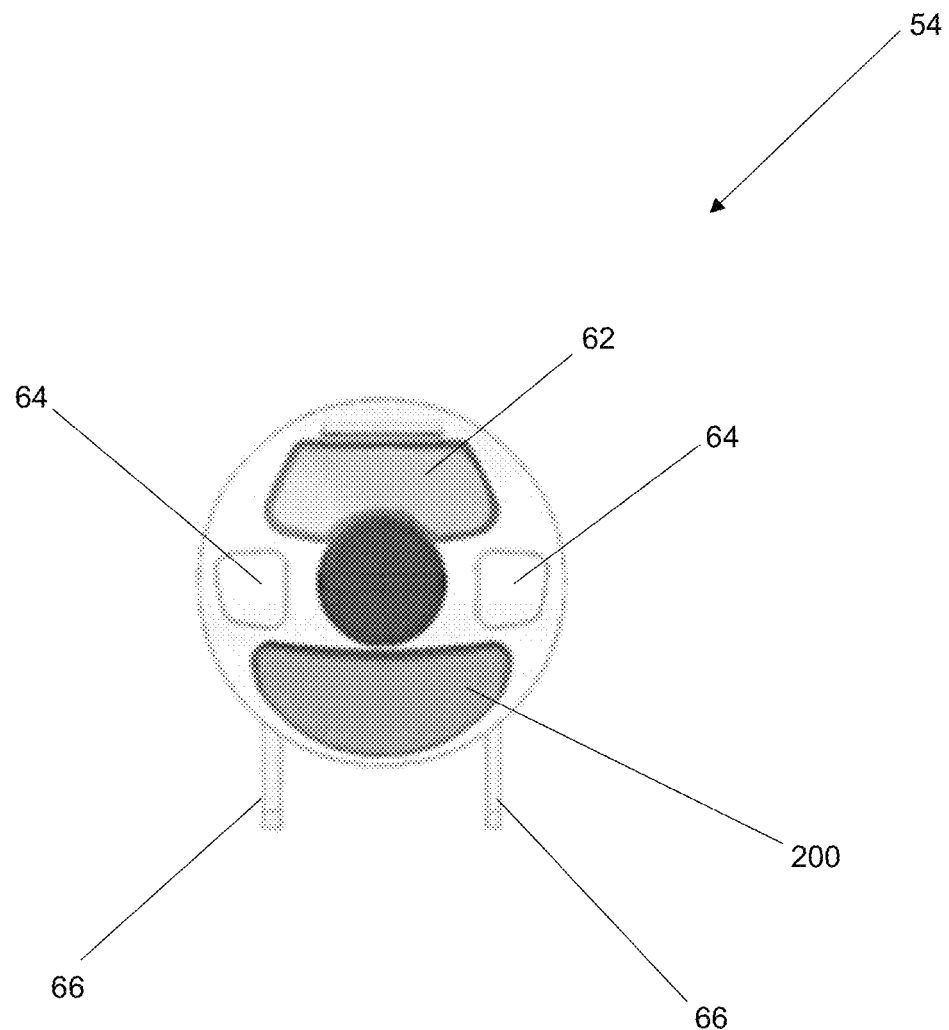
FIG. 6 is a top view of the berley dispenser of FIG. 5.

The homogenizer 30 (as shown in FIG. 4) is located inside the body portion 12 and attached to the head portion 14. The homogenizer 30 has a motor 32, a shaft 34, a supporting bearing 36 and a couple of blades 38.

In use, the motor 32 causes rotation of the shaft 34, the supporting bearing 36 and blades 38. Rotation of the blades 38 results in homogenization of large pieces of berley within the body portion 12. Both the shaft 34 and the blades 38 are intended for high speed use to easily homogenize large pieces of berley into small pieces or even purified into liquid.

The discharge port 16 is located at the base of the body portion 12. The discharge port 16 is used to discharge homogenized berley into the water.

The discharge port 16 has a discharge opening 40 and a valve 42. The opening 40 is closed by the pressure relief valve 42. The pressure relief valve 42 is a two way valve to allow a water/berley mix to exit the body portion 12 when the interior pressure in the body portion 12 is higher than the outside pressure by a first threshold. The pressure relief valve 42 also allows the water to enter the body portion 12 when the interior pressure in the body portion 12 is lower than the outside of the berley dispenser 10 by a second threshold. The press relief valve 42 is a simple flexible membrane type with one or more slits that allow deflection of the membrane (not shown) to open and close as needed.

In use, the discharge port 16 can connect to an extendable pipe (not shown) to discharge the berley into water.

Figure 12:
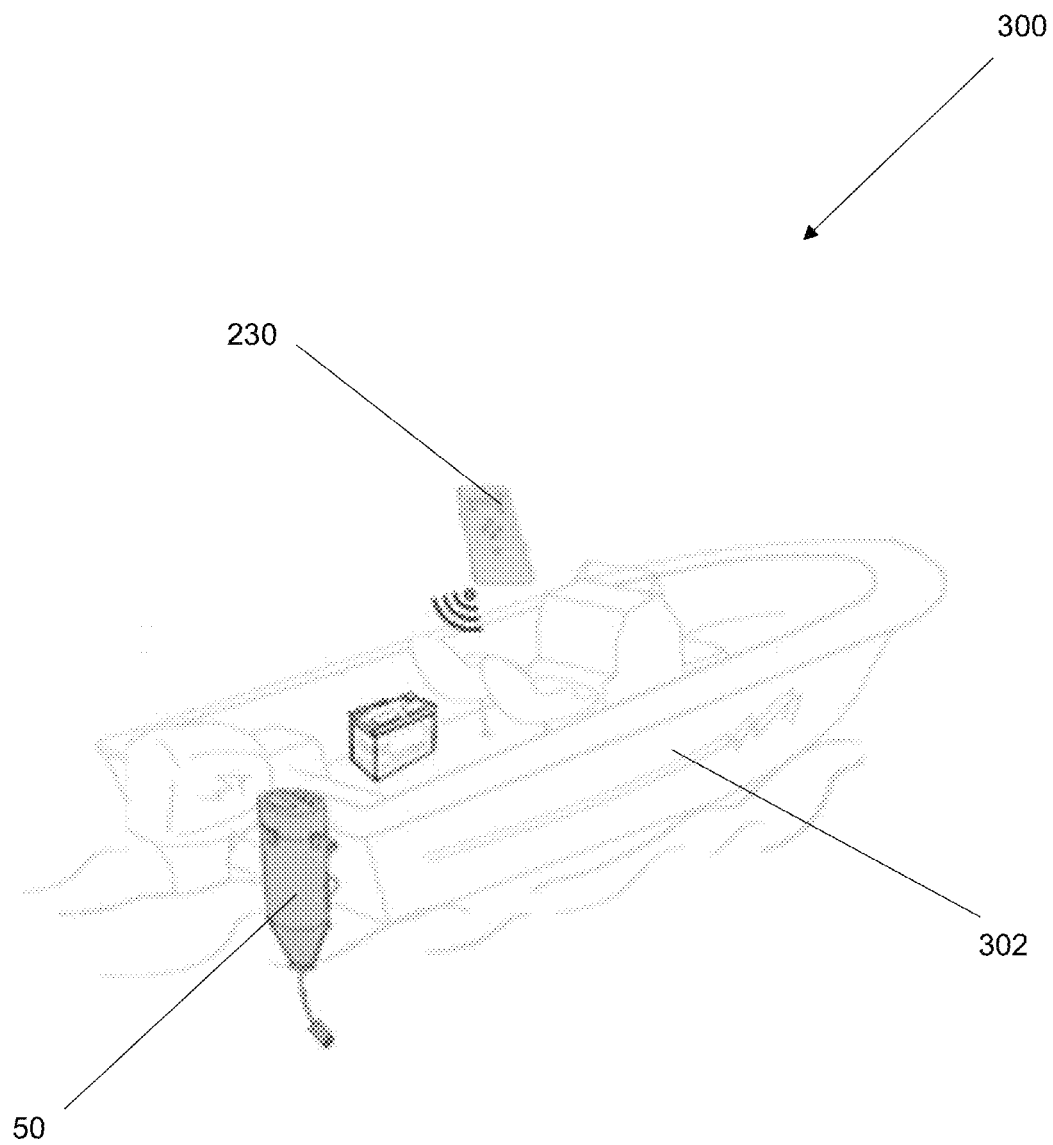
FIG. 12 is a schematic view of a berley dispenser being attached to a boat.

The berley dispenser 10 is attached to a pair of brackets 26 that are also fixed to the outside side of a boat (as shown in FIG. 12).

With reference to FIGS. 5 to 9, there is shown a schematic diagram of a berley dispenser 50 according to a second embodiment of the present invention. The berley dispenser 50 has a body portion 52, a head portion 54, a homogenizer 80 and a discharge port 56.

The body portion 52 is substantially cylindrical in shape. The body portion 52 is made of a transparent plastic material that allows an operator to observe the interior of the body portion 52.

The head portion 54 is attached to the body portion 52 by several clips 60. The head portion 54 fits within the upper end 58 of the body portion 52. A seal (not shown) is located between the body portion 52 and the head portion 54 to provide a fluid tight seal.

The head portion 54 has a berley opening 61 to allow an operator to place berley and/or ingredients into the body portion 52. A removal cap 62 is used to seal the head portion 54.

Figure 10:
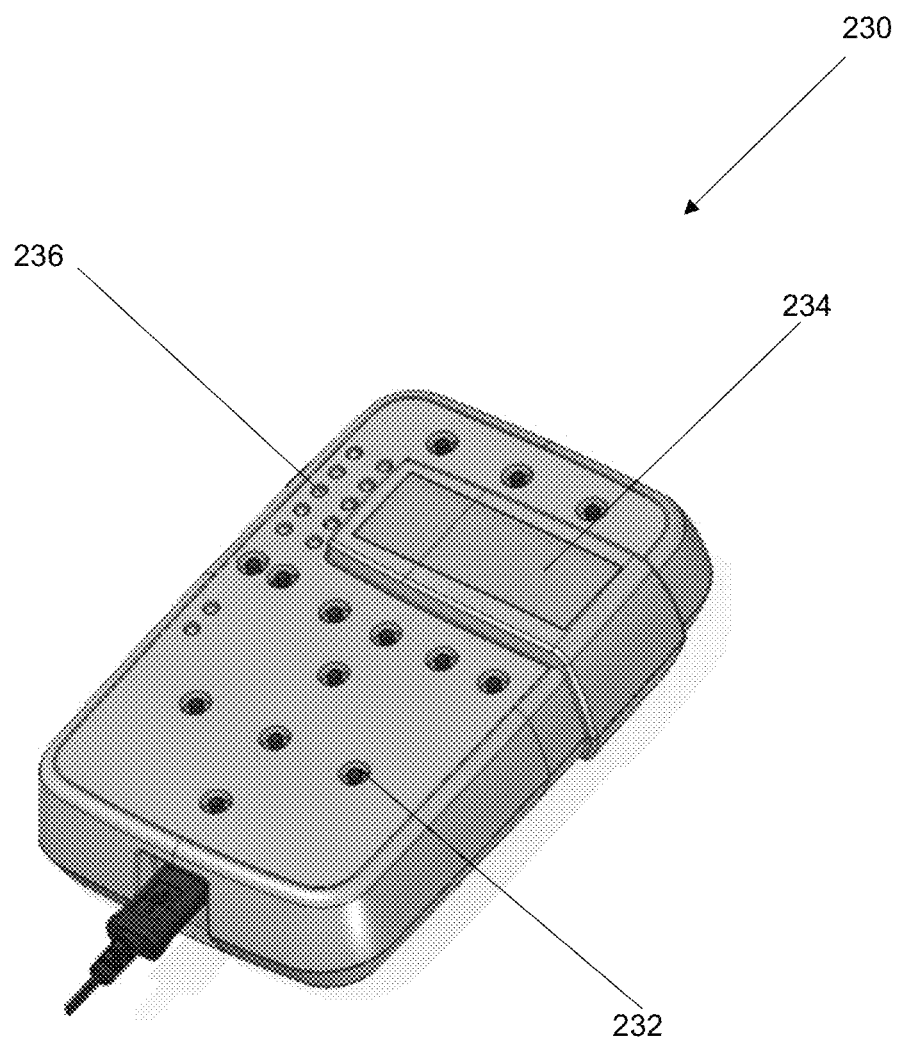
FIG. 10 is a schematic view of a remote controller according to a third embodiment of the present invention.

The head portion 54 also has two air pump breather vents 64. The two air pump breather vents 64 are connected to inlet/outlets 102,104 to allow air to enter/exit the body portion 52. The head portion 54 also has a control unit 200. The control unit 200 wirelessly communicates with a remote controller 230 (as shown in FIG. 10) to control operation of the berley dispenser 50. The details of the control unit 200 and the remote controller 230 will be described later.

The homogenizer 80 is located inside the body portion 52 and attached to the head portion 54. The homogenizer 80 has a motor 82, a shaft 84, a supporting bearing (not shown) and a couple of blades 88.

In use, the motor 82 causes rotation of the shaft 84, the supporting bearing and blades 88. Rotation of the blades 88 results in homogenization of large pieces of berley within the body portion 52. Both the shaft 84 and the blades 88 are intended for high speed use to easily homogenize large pieces of berley into small pieces or even purified into liquid.

The discharge port 56 is located at the base of the body portion 52. The discharge port 56 is used to discharge homogenized berley into the water.

The discharge port 56 has a discharge opening 70 and a valve 72. The opening 70 is closed by the pressure relief valve 72. The pressure relief valve 72 is a two way valve to allow a water/berley mix to exit the body portion 52 when the interior pressure in the body portion 52 is higher than the outside of the berley dispenser 50 by a first threshold. The pressure relief valve 72 also allows the water to enter the body portion 52 when the interior pressure in the body portion 52 is lower than the outside of the berley dispenser 50 by a second threshold. The press relief valve 72 is a simple flexible membrane type with one or more slits that allow deflection of the membrane (not shown) to pen and close as needed.

In use, the discharge port 56 can connect to an extendable pipe (not shown) to discharge the berley into water.

The berley dispenser 50 has a power unit (not shown) which connects to a power cable 90.

The berley dispenser 50 also has two switches 92,94. The switches 92,94 are used to control the operation of the cap 62 to open and/or close of the opening 61.

Figure 7:
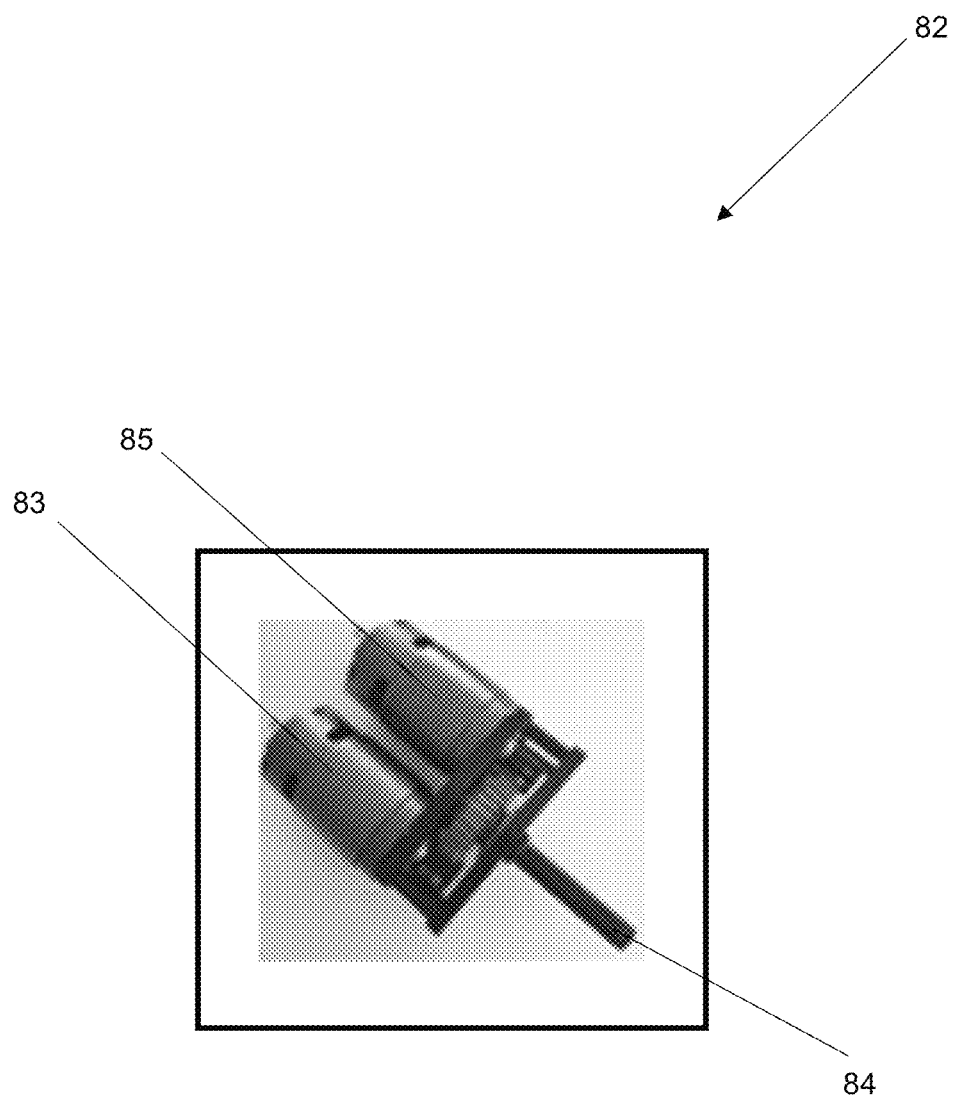
FIG. 7 is a schematic view of a motor of the berley dispenser of FIG. 5.

With reference to FIG. 7, there is shown the motor 82. The motor 82 is a macerator motor. The motor 82 has two rotors 83,85 and one shaft 84. The shaft 84 connects to the blades 88 to drive the blades 88.

The berley dispenser 50 also has an air pump system 98 located within the head portion 54. The air pump system 98 is an inflation and deflation air pump system that communicates with the outside of the berley dispenser 50 via two inlet/outlets 102,104. The air pump system 98 is operated to draw air into the body portion 52 or expel air out of the body portion 52.

Figure 8:
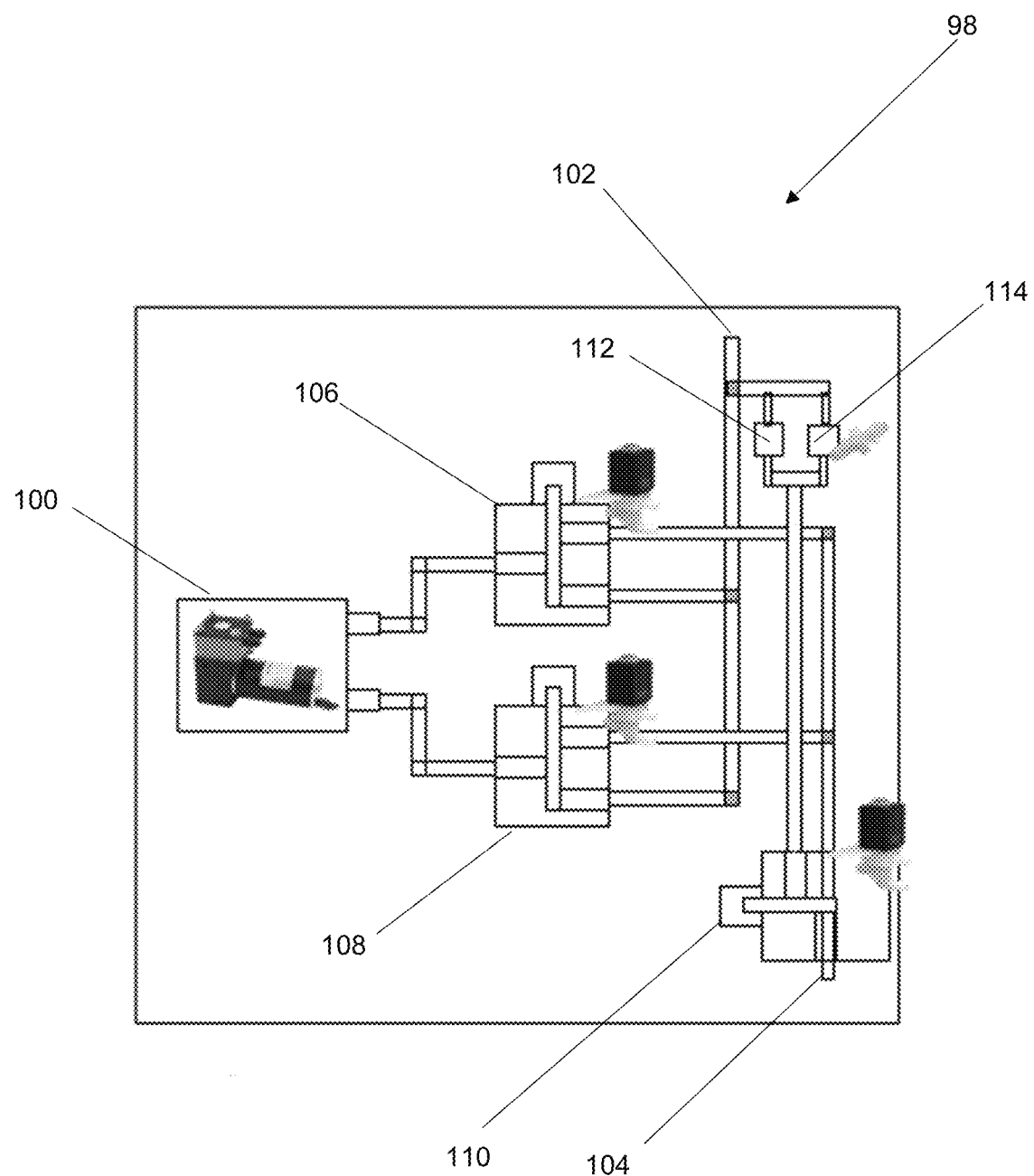
FIG. 8 is a schematic diagram of an air pump system of the berley dispenser of FIG. 5.

With reference to FIG. 8, there is shown a detailed view of the air pump system 98. The air pump system has one air pump 100, two inlet/outlets 102,104, two 3-way solenoid valves 106,108, one solenoid valve 110 and two pressure valves 112,114.

In use, the air pump system assists with forming a berley with a preferred consistency with respect to the particular fish type, drawing and discharging water from the berley dispenser and discharging the berley.

The berley dispenser 50 also has a level sensor in the form of a float 96. The float 96 operates as a switch to control the air pump system 98. In use, when the air pump system 98 is operated to draw water into the body portion 52, it will operate until the water level raised the float 96 above a predetermined level.

Figure 9:
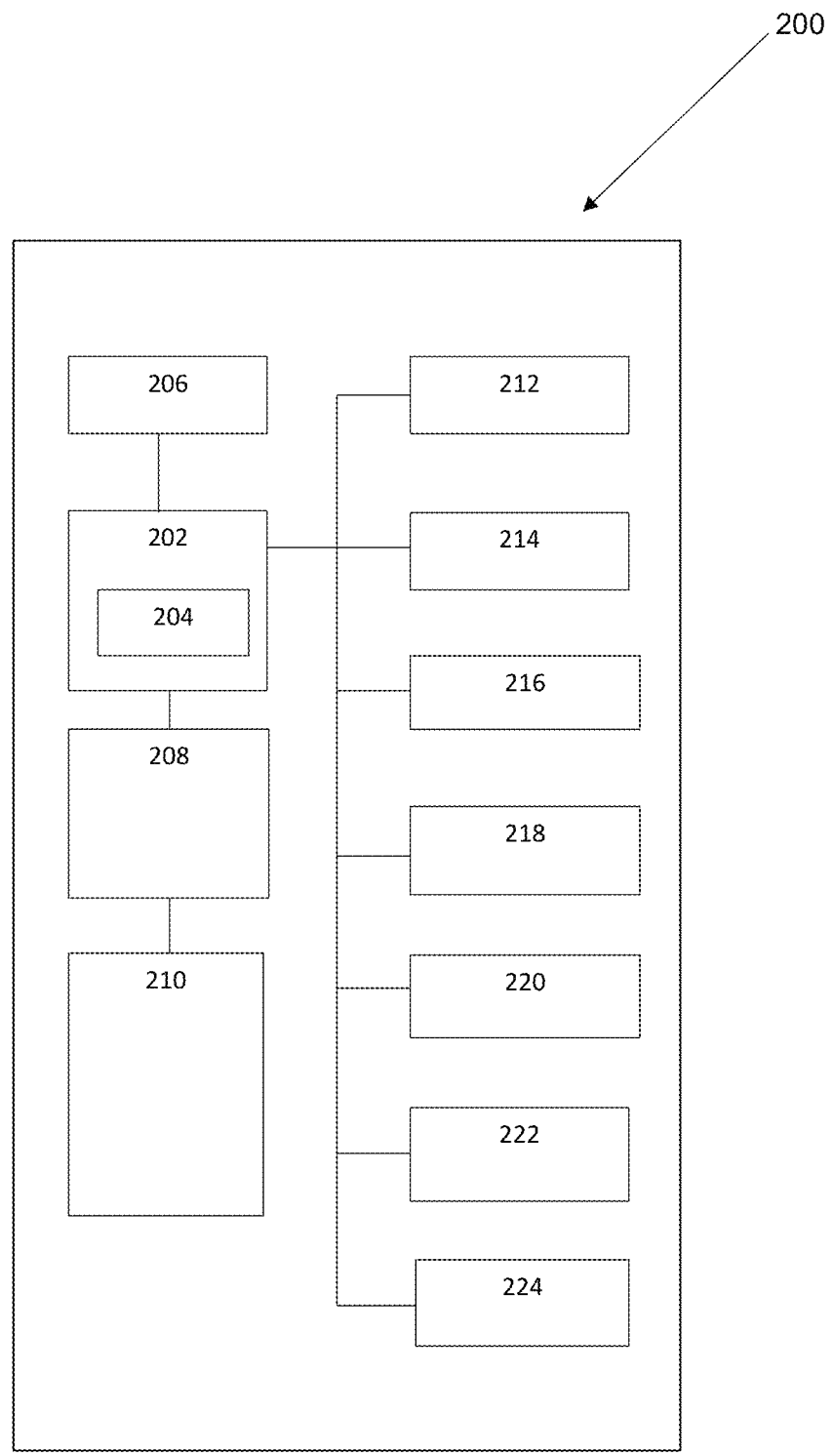
FIG. 9 is a schematic view of a control unit of the berley dispenser of FIG. 5.

With reference to FIG. 9, there is shown a schematic diagrammatic view of the control unit 200 in the form of a PCB. The control unit 200 has a processor 202, a memory 204, a wirelessly communication modular 206, a motor fault detection unit 208, a power unit 210, a display unit 212, a buzzer 214, a LEDs unit 216, a key board/button unit 218, an air pump driver unit 220, a motor driver unit 222 and a solenoid driver unit 224.

In use, the processor 202 processes input transmitted from the display unit 212, buzzer 214, LEDs unit 216, key board/button unit 218, air pump driver unit 220, motor driver unit 222 and solenoid driver unit 224, and/or output data to these units.

The memory 204 stores data processed by the process 202. The memory 204 also stores recipe instructions for the preparation of the berley with respect to different fish types.

In use, a remote controller 230 wirelessly communicates with the control unit 200 to activate different functions.

Figure 11:
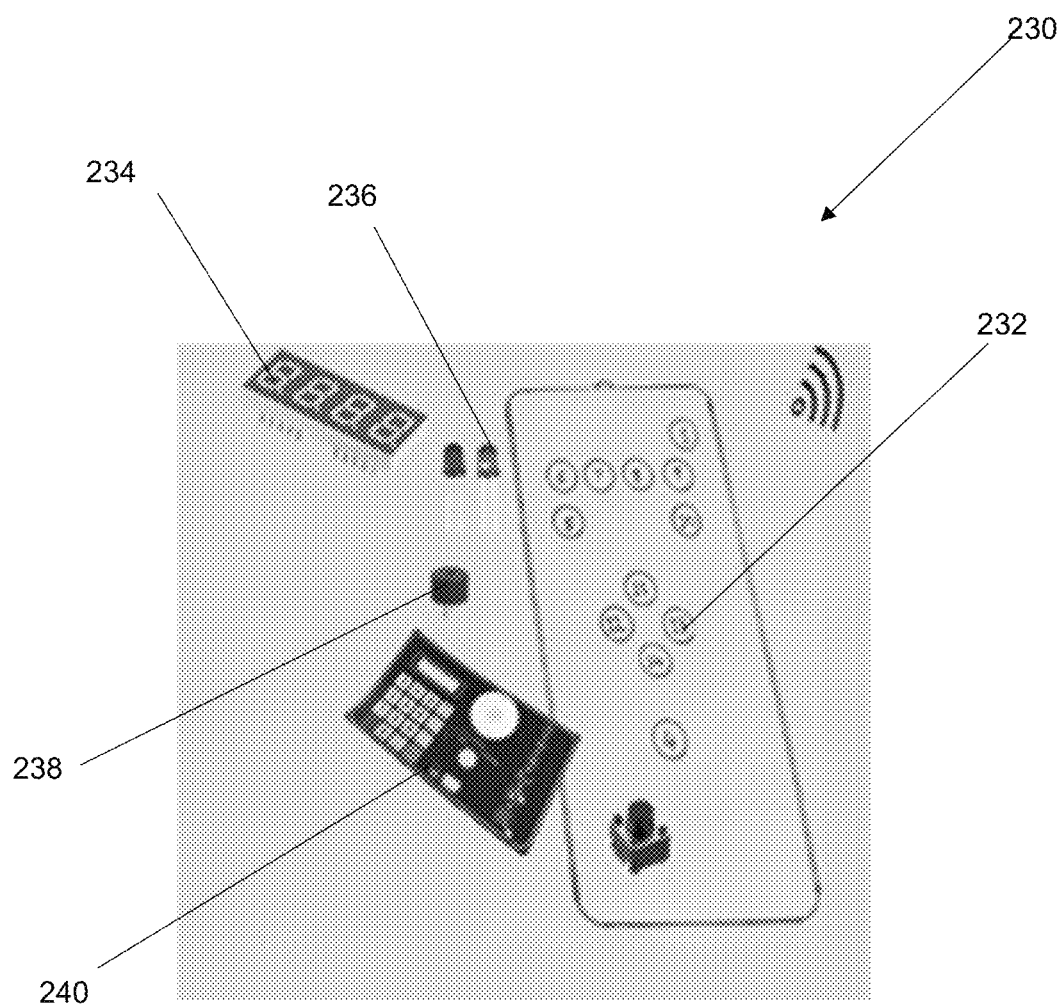
FIG. 11 is a decomposition view of the remote controller of FIG. 10.

With reference to FIGS. 10 to 11, there is shown the remote controller 230 according to a third embodiment of the present invention. The remote controller 230 has a plurality of buttons 232, a display 234, a plurality of LEDs 236 and a PCB 240.

Each of the plurality of buttons 234 enables operation of a corresponding function of the berley dispenser 50:

Each of the plurality of the LEDs 236 indicates a working status or instructions of the berley dispenser 50. A red light from the LEDs 236 indicates that the berley dispenser 50 is waiting for operation. An orange light from the LEDs 236 indicates to add ingredients to the berley dispenser 50. A green light from the LEDs 236 indicates that the berley dispenser 50 is working.

The display 234 is used to display the information of the berley disperser 50 or recipe instructions for preparation of the berley with respect to different fish types. In use, an operator can select a fish type from the buttons 232 to get the recipe instructions on the display 234.

The remote controller 230 also has a buzzer 238. The buzzer 238 is used to indicate an error of the berley dispenser 50. For example, in use, if there is something wrong with the motor 82, the buzzer 238 sounds to alert the operator to the situation.

The remote controller 230 has a wirelessly communication modular (not shown) which communicates with the control unit 200 to control operation of the berley dispenser 50. The operation of the berley dispenser 50 includes selecting a fish type from one or more different fish types; setting chopping speed of the homogenizer 80; setting chopping time of the homogenizer 80; setting chopping direction of the homogenizer 80 which includes chopping forwards or chopping backwards; setting berley discharge quantity; setting berley discharge time period; setting new mix of berley; start and/or pause and/or stop the working of the berley dispenser 50; auto-cleaning the berley dispenser 50; setting manually operation of the berley disperser 50; filling water in the berley dispenser 50; draining homogenized berley and/or water out of the berley disperser 50; displaying recipe instructions for preparation of the berley with respect to different fish types, and/or other personal setting for the berley dispenser 50.

With reference to FIG. 12, there is shown a berley dispenser 50 being attached to a boat 302. The remote controller 230 communicates with the berley dispenser 50 via wireless communication to control operation of the berley dispenser 50.

In another embodiment, the berley dispenser has a stand or is mountable to a stand and a hose is attached to the discharge port. The berley dispenser with a stand or mountable to a stand can be located on a boat, jetty, land or any suitable location where the hose can be placed at a preferred location to discharge the berley.

In use, the remote controller 230 operationally connects with the GPS to determine the location of the berley dispenser 50. The remote controller 230 also communicates with a fish finder (not shown) to detect a particular type of fish. When a particular type of fish is detected, an operator operates the remote controller 230 to select the particular fish type, prepare the homogenized berley with respect to the particular fish type, and remotely control the berley dispenser 50 to discharge the homogenized berley at a predetermined location.

Advantages

An advantage of the preferred embodiment of the berley dispenser includes that the berley disperser can be remotely controlled without touching the berley dispenser. Another advantage of the preferred embodiment of the berley dispenser includes that the berley can be homogenized and discharged with respect to different fish types. A further advantage of the preferred embodiment of the berley dispenser includes that the berley can be homogenized and discharged with respect to the location and/or detection of the fish.

Variations

While the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A berley dispenser comprising:
   a container to store berley;
   a homogenizer within the container configured to form a homogenized berley from one or more predetermined homogenized berley settings where each setting corresponds to a particular fish type;
   a discharge port configured to discharge the homogenized berley, and
   a controller configured to control the homogenization of the berley by the selection of the one or more predetermined homogenized berley settings to form the homogenized berley and control the discharge of the homogenized berley;
   wherein said controller is operable to communicate with a GPS navigator or fish finder configured to coordinate the homogenization of the berley and/or discharge of the homogenized berley.

2. A berley dispenser as claimed in claim 1 wherein the predetermined homogenized berley settings corresponds to a particular fish type by being an effective attractant for the particular fish type.

3. A berley dispenser as claimed in claim 1 wherein the controller has an operatively connected input arrangement, a processor, and a plurality of electrical connections connecting the processor to the input arrangement and the berley dispenser so that the berley dispenser can homogenize and discharge the homogenized berley; the input arrangement includes one or more interfaces selected from one or more of one or more buttons, a keyboard, a display and/or a touch screen.

4. A berley dispenser as claimed in claim 3 wherein the input arrangement allows the activation of one or more functions of the berley dispenser; the one or more functions comprise selecting a fish type from the one or more different fish types, setting chopping speed of the homogenizer, setting chopping time of the homogenizer, setting chopping direction of the homogenizer which comprises chopping forwards or chopping backwards, setting berley discharge quantity, setting berley discharge time period, setting new mix of berley, start and/or pause and/or stop the working of the berley dispenser, auto-cleaning of the berley dispenser, setting manually operation of the berley disperser, filling the berley dispenser with water, draining homogenized berley and/or water out of the berley disperser, displaying recipe instructions for the preparation of the berley with respect to different fish types, and/or other personal setting for the berley dispenser.

5. A berley dispenser as claimed in claim 1 wherein the controller further includes a memory that stores input provided from the one or more interfaces for processing purposes to operate the berley dispenser, the memory also stores data processed by the processor including default settings for the berley dispenser and recipe instructions for the preparation of the berley with respect to different fish types.

6. A berley dispenser as claimed in claim 1 wherein the controller controls the operation of the homogenizer including particle size and duration of cutting and homogenization.

7. A berley dispenser as claimed in claim 1 wherein the controller can communicate with a GPS configured to determine the location of the berley dispenser with respect to a geographical position and or the controller can connect to a fish finder configured to detect fish, wherein the controller operates the berley dispenser to homogenize the berley for a particular fish type and discharge the homogenized berley when a particular location is reached or when the particular fish type is detected depending whether a location setting or a fish detection setting is selected respectively.

8. A berley dispenser as claimed in claim 1 wherein the operation of the berley dispenser is controlled by a remote controller which communicates with the berley dispenser via wireless communication by Wi-Fi or Bluetooth.

9. A berley dispenser as claimed in claim 1 wherein the berley dispenser is operated and controlled with a software application on a mobile device.

10. A berley dispenser as claimed in claim 1 wherein the container comprises a head portion attached or attachable by one or more clips to a body portion that when attached seals the head and body portions; the body portion can store berley, fish or bait and can be homogenized within the body portion.

11. A berley dispenser as claimed in claim 1 wherein the container has a transparent portion so that an operator can observe the interior of the body portion and visually determine the operational state of the berley dispenser, whether the berley is homogenized, and the amount of berley present in the container.

12. A berley dispenser as claimed in claim 1 wherein the container comprises a head portion attached or attachable by one or more clips to a body portion; said head portion has a sealable opening for the introduction of berley, fish or bait; said head portion has an air pump which draws air into the body portion and/or expels air out of the body portion; the discharge port comprises a discharge opening and a valve operatively associated with the discharge opening; said valve is a two way valve that allows berley to discharge and allows water to enter the body portion; said head portion has a level sensor that enables the air pump to stop drawing water into the body portion when the water level has reached a predetermined level.

13. A berley dispenser as claimed in claim 1 wherein the container comprises a head portion attached or attachable by one or more clips to a body portion; the homogenizer is located within the body portion and attached to the head portion; the homogenizer comprises a motor connected to a shaft with one or more blades located at or near a free end of the shaft; the controller controls the speed, duration and direction of rotation of the blades.

14. A berley dispenser as claimed in claim 1 wherein the container comprises a head portion attached or attachable by one or more clips to a body portion; the discharge port is located at or adjacent a base of the body portion; the discharge port comprises a discharge opening and a valve operatively associated with the discharge opening; said valve can be a one way valve that allows berley to discharge from the body portion or a two way valve that can allow berley to discharge and allow water to enter the body portion depending on the operational position of the valve; the controller controls the operational position of the valve.

15. A berley dispenser as claimed in claim 1 wherein the container further includes an attachment portion that allows attachment to the side of a boat to enable berley to be discharged directly to the water.

16. A berley dispenser as claimed in claim 1 wherein the berley dispenser has a stand or is mountable to a stand and a hose is attached to the discharge port so that berley can be discharged at a preferred location.

17. A berley dispenser as claimed in claim 1 wherein a hose is attachable to the discharge port to serve as a conduit for the flow of berley from the berley dispenser to the discharge site.

* * * * *